(12) United States Patent
Parsons et al.

(10) Patent No.: US 12,223,339 B2
(45) Date of Patent: Feb. 11, 2025

(54) MANAGEMENT OF SECRETS DURING DEPLOYMENT OF VIRTUAL ENVIRONMENT

(71) Applicant: MICROSOFT TECHNOLOGY LICENSING, LLC, Redmond, WA (US)

(72) Inventors: James Duncan Parsons, Enfield (GB); Peter John Whiting, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 553 days.

(21) Appl. No.: 17/539,161

(22) Filed: Nov. 30, 2021

(65) Prior Publication Data

US 2023/0073812 A1    Mar. 9, 2023

Related U.S. Application Data

(60) Provisional application No. 63/242,439, filed on Sep. 9, 2021.

(51) Int. Cl.
*G06F 9/455* (2018.01)
*G06F 16/21* (2019.01)

(52) U.S. Cl.
CPC ........ *G06F 9/45558* (2013.01); *G06F 16/212* (2019.01); *G06F 2009/4557* (2013.01)

(58) Field of Classification Search
CPC .............. G06F 9/45558; G06F 16/212; G06F 2009/4557; G06F 8/60
See application file for complete search history.

(56) References Cited

U.S. PATENT DOCUMENTS

| | | | | |
|---|---|---|---|---|
| 2015/0033305 A1* | 1/2015 | Shear | ...................... | G06F 21/53 |
| | | | | 726/11 |
| 2018/0083937 A1* | 3/2018 | Jahner | ....................... | G06F 8/60 |
| 2019/0394204 A1* | 12/2019 | Bansal | ................ | H04L 63/0815 |
| 2020/0177591 A1* | 6/2020 | Pogrebinsky | ......... | G06F 9/5072 |
| 2020/0267004 A1* | 8/2020 | Lounsberry | ........... | H04L 9/3265 |
| 2020/0319905 A1 | 10/2020 | Yang et al. | | |
| 2021/0392111 A1* | 12/2021 | Sole | ........................ | H04L 63/10 |

OTHER PUBLICATIONS

"International Search Report and Written Opinion Issued in PCT Application No. PCT/US22/040680", Mailed Date: Nov. 17, 2022, 11 Pages.

* cited by examiner

*Primary Examiner* — Dong U Kim
(74) *Attorney, Agent, or Firm* — Han Gim; Newport IP, LLC

(57) ABSTRACT

Techniques are described for deploying a virtualized computing environment configured in a user-specific configuration, the virtualized network function comprising a plurality of virtual machines. A solution definition file (SDF) identifies a configuration for the deployment. The SDF replaces each secret needed for the deployment with an identifier for the secret. A schema defines a format for each identifier for each secret included in the SDF and a format of the secrets. The secrets and corresponding identifiers are stored in a secure storage. The identifiers are sent to the deployed virtual machines, the identifiers being usable by the virtual machines to obtain the secrets from the secure storage.

18 Claims, 8 Drawing Sheets

MANAGEMENT OF SECRETS DURING DEPLOYMENT OF VIRTUAL ENVIRONMENT

PRIORITY APPLICATION

The present application is a non-provisional of and claims priority to, the earlier filed U.S. Provisional Application Ser. No. 63/242,439 filed on Sep. 9, 2021, the contents of the listed application are hereby incorporated by reference in their entirety.

BACKGROUND

Service providers can provide computing services to businesses and individuals as a remote computing service or provide "software as a service" (e.g., cloud computing). In some cases, users may deploy products and services from service providers on their own premises. When deploying resources, such as virtualized resources, in a customer computing environment, various issues may arise, resulting in deployment delays which in turn can prevent the customer from providing services to their downstream users. This can lead to lost revenue and customer dissatisfaction. Production loss and inefficiencies with respect to computing resources can be exacerbated when configuration issues arise and the service provider is unable to quickly isolate and correct the cause of a misconfiguration issue.

It is with respect to these considerations and others that the disclosure made herein is presented.

SUMMARY

The disclosed embodiments describe technologies for efficiently coordinating secrets across various virtual machines (VMs) using a service that is configured to perform a deployment or upgrade sequence required to perform the deployment or upgrade. Various embodiments disclosed herein describe techniques for implementing a VM deployment/upgrade service that is configured to validate secrets across a set of VMs or containers that need to work together during an upgrade or deployment. In some embodiments, the service may autogenerate secrets so that the user does not need to supply them.

The described techniques can allow for a service provider or customer to more efficiently deploy computing resources while maintaining efficient use of computing capacity such as processor cycles, memory, network bandwidth, and power. In addition, the described techniques enable service providers to manage secrets by providing cross-product infrastructure that supports the secure storage, retrieval, and rotation of secrets.

This Summary is provided to introduce a selection of concepts in a simplified form that are further described below in the Detailed Description. This Summary is not intended to limit the scope of the claimed subject matter.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
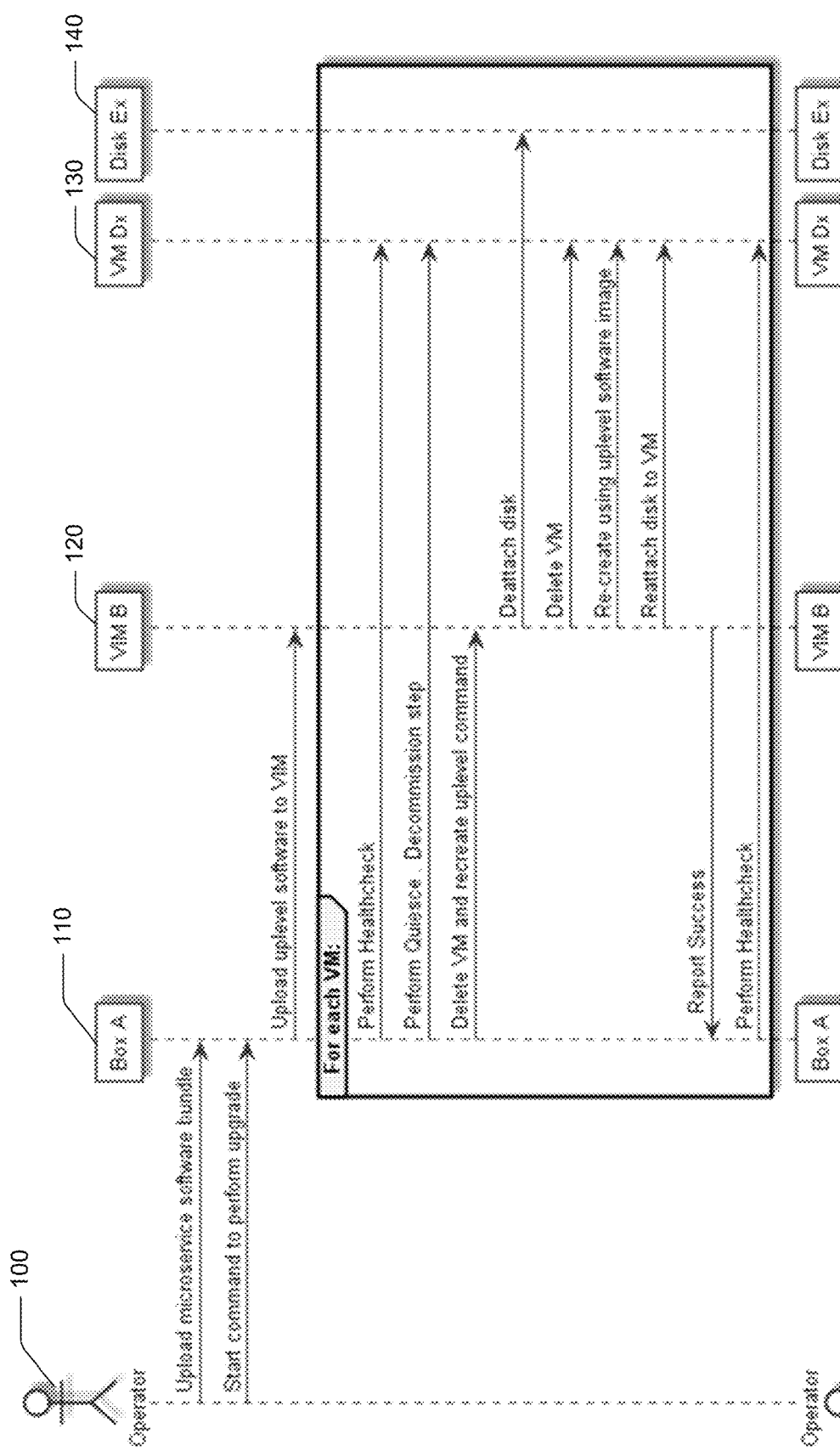
FIG. 1 is a diagram illustrating an example architecture in accordance with the present disclosure.

The disclosed embodiments describe technologies for efficiently coordinating secrets across various virtual machines (VMs) or containers using a service that is configured to perform a deployment or upgrade sequence that is required to perform the deployment or upgrade.

Many services provided by service providers are implemented in the context of a microservices architecture where software is delivered as smaller, fine-grained, loosely coupled, and independently scalable units that are configured to provide a service. A microservices architecture typically relies on the platform/infrastructure, for example, to coordinate and deploy or manage upgrades of software across a large pool of virtual machines/containers providing that service. For containers, many services are built around Kubernetes for providing such processes. However, when the microservices are packaged as VMs that may in turn run on potentially different clouds (e.g., on VMware, vSphere, or OpenStack), there is no easy way to efficiently perform the deployment or upgrade process. For example, upgrading a virtualized network function (VNF) may involve upgrading various VNFCs, each of which may comprise a pool of VNFC instances (VNFCIs) or VMs.

One key issue that can prevent efficient automation is that the steps that must be performed when upgrading a specific VM may vary from VM to VM. As an upgrade typically entails a loss of function because the VM is removed and replaced by an updated version, the steps required to do so in a safe manner may differ. For some functions, the VM may require that other nodes that the VM is communicating with are informed that the VM is going down so that the nodes can reroute traffic or reconnect, or otherwise risk an outage. In some cases, the VM may simply need to complete any current processing to avoid losing data, but otherwise does not need to provide notifications. In other situations, it may be preferable for the VM to be restarted as quickly as possible without any further actions.

In addition, performance of deployments or upgrades often requires the cloud environment to take actions, as upgrading a VM requires the cloud environment to remove the VM and replace it with a new up-to-date version (rather than the VM itself changing the software). While the cloud environment can remove and create VMs, the specific steps to do so may differ in different cloud environments. Such actions may be performed by a virtualized infrastructure manager (VIM) for the cloud environment. Typically, each cloud environment may have a different VIM.

Thus, if there are m different microservices, and n different VM cloud environments, there could potentially be n*m different procedures for performing an upgrade. It would be preferable to provide a mechanism for microservice developers to describe deployment or upgrade mechanisms as a configuration and provide tooling that can enact that deployment or upgrade on any VIM, without that microservice development team having to understand and account for details of the particular environment (i.e., VIM) for the deployment.

Accordingly, a VM deployment or upgrade service may be implemented that is configured to perform the deployment or upgrade sequence and handle the steps required for the deployment or upgrade on the VMs and the VIM. In various embodiments disclosed herein, the VM deployment or upgrade service may be configured to validate secrets across a set of VMs or containers that need to work together during an upgrade or deployment. In some embodiments, the VM deployment or upgrade service may autogenerate secrets so that the user does not need to supply them.

While the examples herein are described with reference to virtual machines, it should be understood that other embodiments may include other types of virtualized components while implementing the described techniques. Additionally, the disclosed embodiments may be applied to performance of upgrades across clusters across multiple cloud deployments.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

In an embodiment, a VM deployment or upgrade service may be implemented that is configured to perform the upgrade operations described above. The service may be referred to herein as the SIMPL VM. The SIMPL VM may be configured to perform operations on each VIM in a microservice-agnostic, VIM-specific way.

For each microservice, a release package may be generated that contains the software image to be upgraded to, as well as one or more configuration files that can be read by the SIMPL VM. The SIMPL VM need not have specific knowledge about a particular microservice. Rather, the SIMPL VM needs only to understand the configuration files in the release package which can declare what health checks to perform, what quiesce steps to take (in an embodiment, these may be Ansible scripts), and what persistent volumes this service has. In an embodiment, YAML configuration files may be used. The SIMPL VM can then perform deployment or upgrades, by interspersing the microservice-agnostic, VIM-specific steps that it has received, and the microservice-specific, VIM-agnostic steps, as defined in the release package. For simplicity the steps are illustrated in a sequential fashion. However, at least some of the steps may be performed in parallel (e.g., upgrading a n+k cluster, k nodes at a time).

Examples of the steps and components for an upgrade process as described above are illustrated with reference to FIG. 1. The SIMPL VM component 110, which may be, for example, a virtual machine, may be deployed in a target environment that includes a VIM 120 and one or more VMs 130 that may further be attached to one or more storage devices 140. The SIMPL VM component 110 may receive a microservice software package that may be initiated by an operator 100. In an embodiment, the operator 100 may send a command to perform an upgrade based on the software bundle. The software bundle may include the new version of the software as well as configurations for performing the upgrade as discussed above. The configuration format may be human- and machine-readable format which may be automatically or manually generated based on existing documentation and/or user inputs prior to use of the SIMPL VM component 110.

The SIMPL VM component 110 may be invoked (for example by running a command in a terminal session) and it may read the configuration and receive the uplevel software.

The SIMPL VM component 110 may upload the uplevel software to the VIM 120. For each VM to be upgraded, the SIMPL VM component 110 may perform a health check, and perform a quiesce or decommission step. As appropriate for the target environment, the SIMPL VM component 110 may send an instruction to delete a VM and recreate the uplevel command. The VIM 120 may detach attached disks 140 as appropriate, delete the VM, recreate the VM using the uplevel software image, and reattach the disk 140 to the upleveled VM. The VIM 120 may further report whether the upgrade was successful. The SIMPL VM component 110 may perform a healthcheck on the upleveled VM to confirm that the upleveled VM is operating.

In some embodiments the SIMPL VM component 110 may generate a report containing results of the upgrade operations. The report 140 may be generated in a format (for example, CSV) that may be read directly or imported into downstream reporting or auditing tools.

The present disclosure describes how a function such as the SIMPL VM can validate secrets across a whole set of VMs or containers that need to work together before a deployment or upgrade. The SIMPL VM may also autogenerate secrets where possible so that the user does not need to supply them. As used herein, secrets may be defined as data which allow authentication to a remote system, a component (e.g., a database), or are used in the encryption of any other data. Secrets may be defined broadly as including, for example:

passwords
SSH keys (both public and private)
certificates and the key that was used to sign them In some scenarios, some products may have secrets hard-coded in code, and some products have secrets written into configuration files that may or may not be checked into version control. Some products may store secrets in plain text on disk. The present disclosure addresses some of the shortcomings of such implementations.

In some implementations, the configuration for a deployment or upgrade may be provided in a solution definition file (SDF). In an embodiment, the SDF may be a single, declarative YAML file that encapsulates the information necessary to set up a specific deployment or upgrade. The SDF may encode information such as customer selections that alter the shape of a VNFD (for example: whether to deploy a product in its paired or standalone variant, whether to deploy the virtualized network function component (VNFC) with a data disk, whether to use security groups). The SDF may also encode information such as customer environment variables (for example: node names, IPs etc., how many instances to deploy).

That SDF may be validated against a series of YANG schemas (one overall deployment schema and one product-options schema per product—these latter schemas may be defined in downloadable CSARs—Cloud Service Archives). Rather than writing the secrets inline in the SDF, the present disclosure enables the replacement of the secrets in the SDF with identifiers for those secrets. In an embodiment, the YANG schemas may contain sufficient information to not only specify the format of the identifier, but also the format of the secret.

For example:
This is a password
It must be n characters long
It must match this regular expression
Or:
This a public SSH key
It must be pair with that private key (referencing a private key identifier somewhere else in the SDF)
Or:
This is a certificate
It must be signed by that key (pointing to a key identifier somewhere else in the SDF)

In some embodiments, a user interface may be provided that enables a user to:
Autogenerate all the secrets. In an embodiment, an autogeneration function may be provide that creates a secret for each identifier in the SDF. The generated secrets may adhere to the rules provided in the YANG schemas.
Enter the secrets manually for each of the secret identifiers in the SDF. The secrets may then be validated to check that they conform to the rules provided in the YANG schema.
Some combination of the above.

In an embodiment, the secret/identifier pairs may be stored at a key management system (KMS), such as Azure Key Vault, Hashicorp Vault, or CyberArk. Alternatively, the secret/identifier pairs may be stored to an encrypted file on the VMs once they have been deployed if a KMS is unavailable. More generally, a secret store may be provided for storing of secret/identifier pairs.

When the SIMPL VM deploys each of the VMs in the deployment or upgrade, instead of passing the secrets in the bootdata, the SIMPL VM instead may pass the identifiers and details of the KMS. The VM may then download the required secrets from the KMS.

The validation may apply on a deployment or an upgrade of the VMs (or other changes to the deployment). At the point a VM is upgraded, a new CSAR may be downloaded. If the requirements on any of the secrets has changed, this will be detected during validation that will automatically run before the upgrade is allowed to proceed.

In an embodiment, when a VM is deployed, the SIMPL VM may notify the KMS of the new node and the SSH private keys it needs. The KMS may store the SSH private key. When the SIMPL VM needs to access the VM (e.g., to perform a health check action) it may retrieve the appropriate SSH private key from the KMS.

When the SIMPL VM upgrades a VM, that VM may be deleted and redeployed with a new SSH host key. To allow the KMS to respond with this, the SIMPL VM may update the KMS by deleting and recreating the account.

The disclosed embodiments provide an efficient way to perform deployments or upgrades of different environments (e.g., there is no need for an agent on the VM, nor any assumptions about the VM itself), therefore enabling orchestration of VMs from multiple vendors. Additionally, the development team need not write code to effect the deployment or upgrade, and only need to prepare the configuration files. When a new VIM is implemented, new interactions with the VIM need only be defined once, and the upgrade procedure can be automatically generated. Finally, upgrades may be performed in a microservice-agnostic way, which may enable coordinating upgrades across connected microservices.

With regard to deployment and generation of secrets, the autogeneration of secrets may reduce the amount of configuration that a user needs to manage and enter, thus reducing the possibilities of error. Additionally, the VM deployment or upgrade service may verify that all secrets that are implemented for a given deployment are valid before starting the deployment, thus allowing for detection of missing or incorrectly entered information, and detection of misconfigurations caused by changing requirements due to an upgrade. This can allow for reduced effort and cost in debugging secrets issues, such as mismatched keys/certificates between multiple functions, thus allowing for more efficient deployments and upgrades and an improved customer experience.

Figure 2:
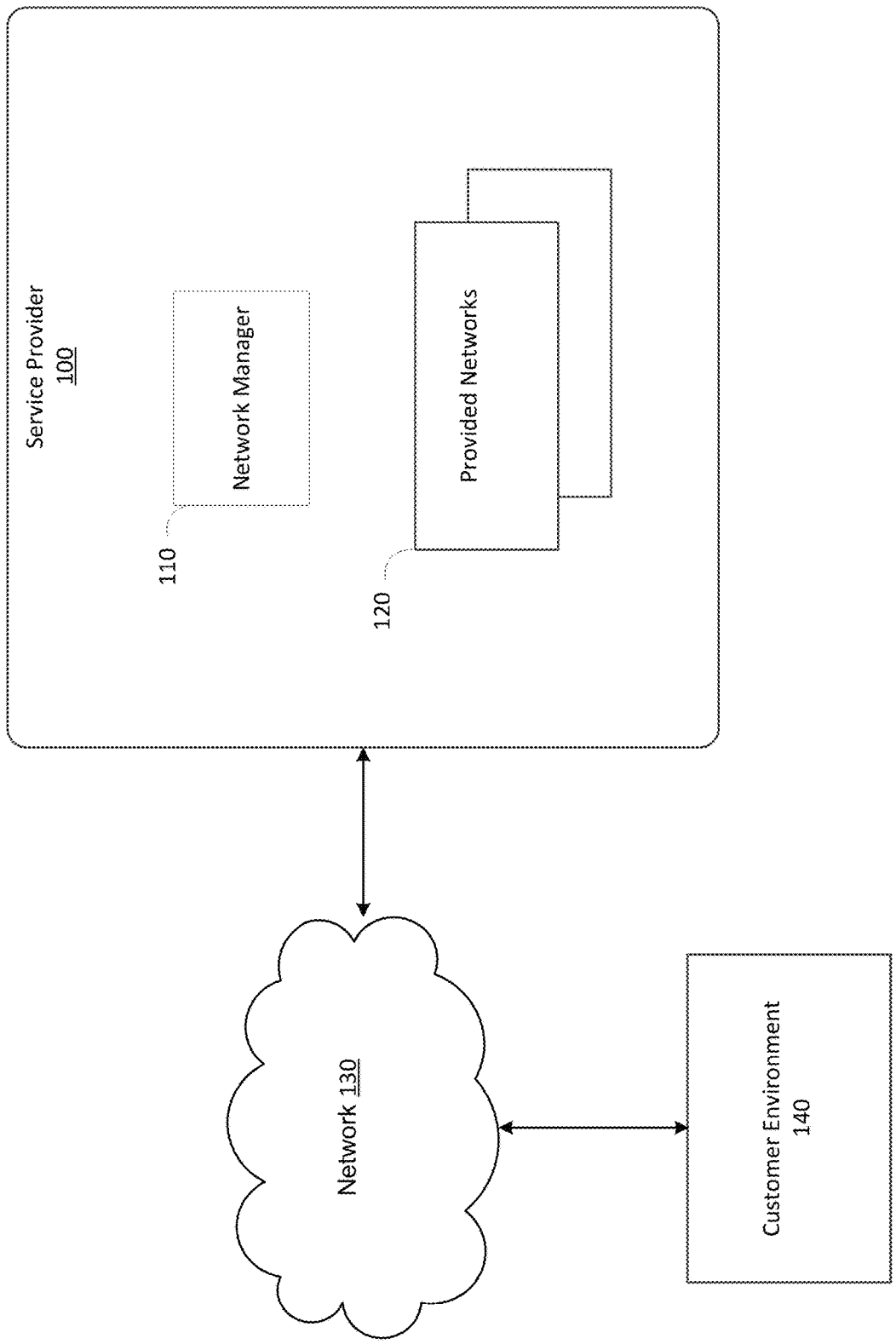
FIG. 2 is a diagram illustrating an example architecture in accordance with the present disclosure.

FIG. 2 illustrates an example computing environment in which the embodiments described herein may be implemented. FIG. 2 illustrates a service provider 100 that is configured to provide computing resources to users at customer environment 140. The customer environment 140 may have user computers that may access services provided by service provider 100 via a network 130. The computing resources provided by the service provider 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the customer environment 140.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 2 has been greatly simplified and that many more networks and networking devices may be utilized to interconnect the various computing systems disclosed herein. These network topologies and devices should be apparent to those skilled in the art.

Figure 3:
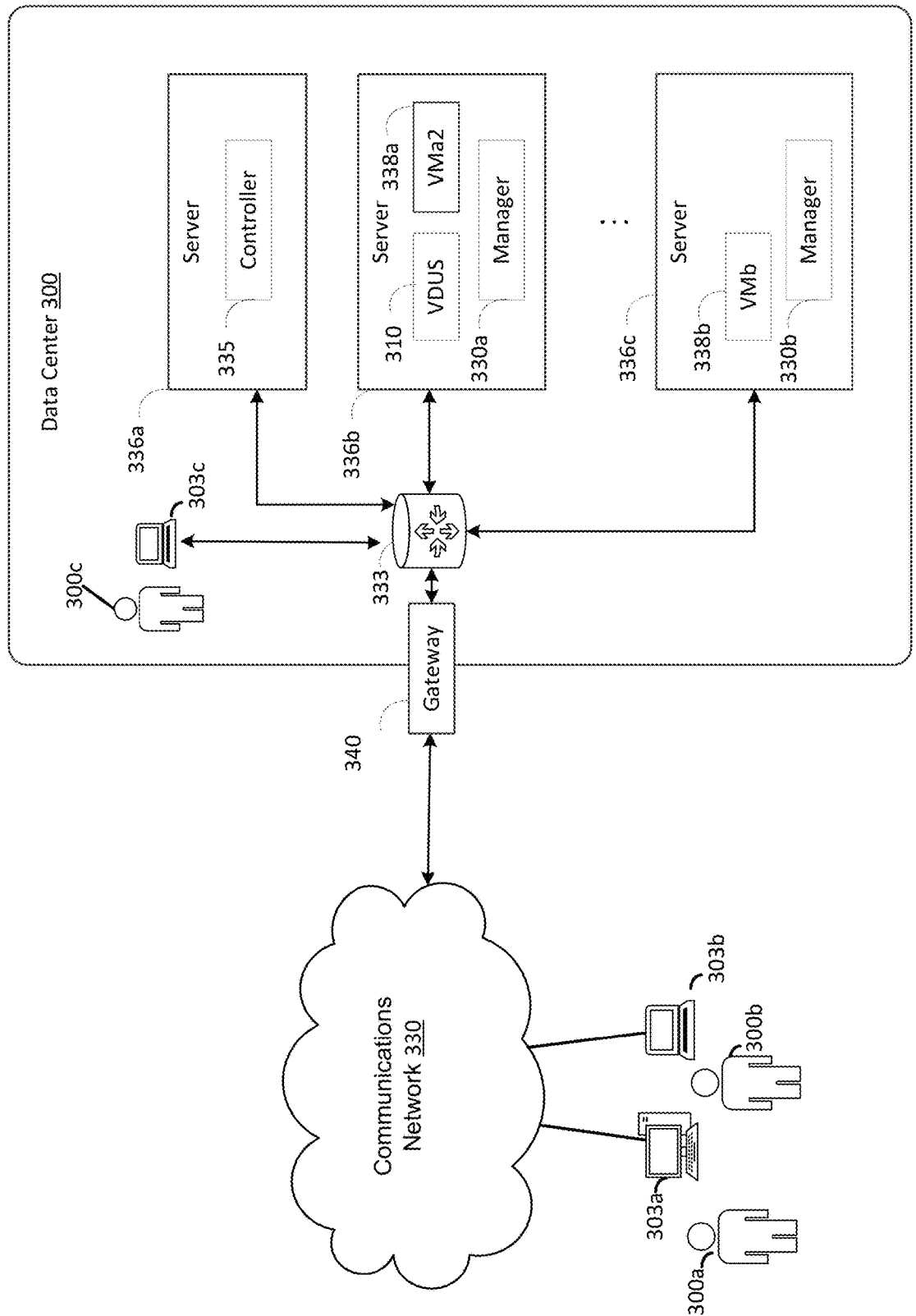
FIG. 3 is a diagram illustrating an example architecture in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to data center 100 and 110 of FIG. 2. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

In an embodiment, a VM deployment or upgrade service (VDUS) 310 as described herein may be implemented in server 336b.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
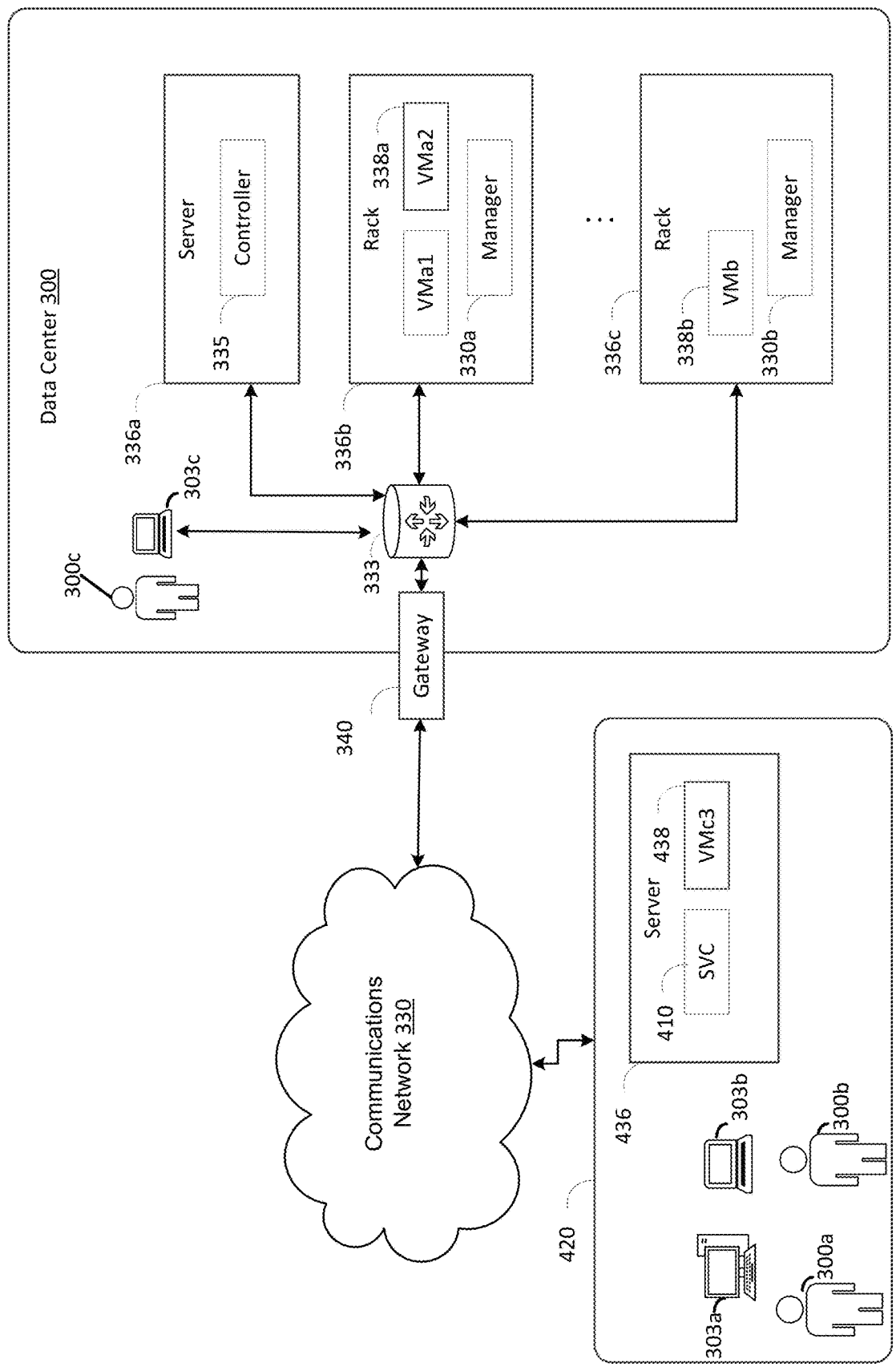
FIG. 4 is a diagram illustrating an example architecture in accordance with the present disclosure.

FIG. 4 illustrates an example computing environment illustrating testing at deployment site 420, in accordance with the present disclosure. In one embodiment, one or more servers 436 may be installed at the edge site 420. In an embodiment, servers 436 instantiate and run virtual machines 438. In an embodiment, a SIMPL VM component (SVC) 410 as described herein may be implemented in server 436.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
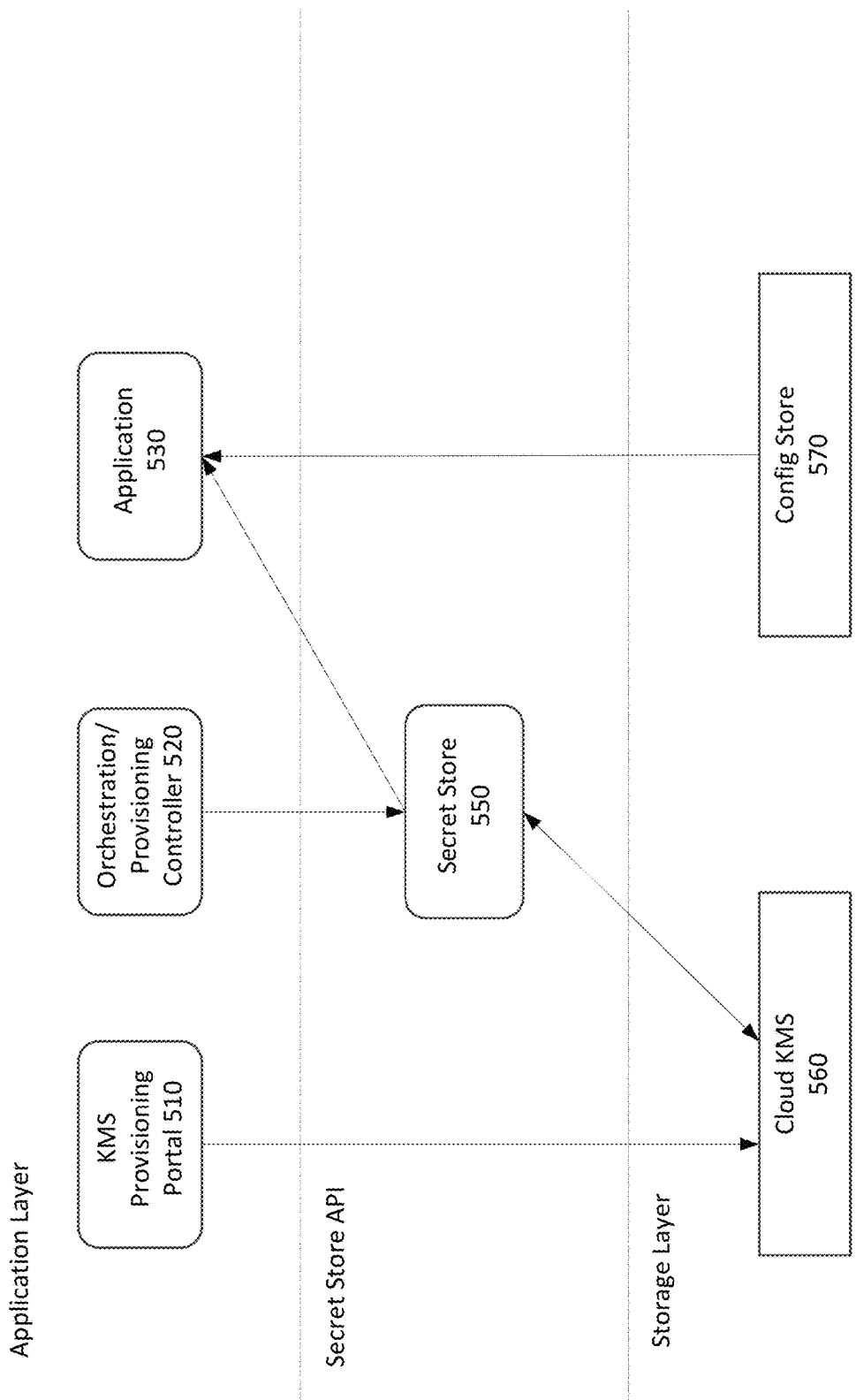
FIG. 5 is a diagram illustrating an example architecture in accordance with the present disclosure.

With reference to FIG. 5, illustrated is one example architecture for efficiently managing secrets associated with the deployment or upgrade of a customer environment. In an example, the secrets store 550 may be a trust-based container with an HTTP interface and is configured to be an abstraction layer. Constative information such as passwords may be removed from the SDF, and stored at various backends such as CyberArk, Azure Key Vault, or Hashicorp Vault. The secret store 550 may be configured to communicate with the backends and store credentials to connect to the backends. KMS provisioning portal 510 may be provided at the application layer to enable users to write to storage through the portal. The orchestration/provisional controller 520 may write to the secret store 550. The application 530 that consumes the secrets may read from the secret store 550 in the same way that it reads config files. The application 530 may access config store 570 for non-secrets and references to secrets. The secret store 550 may read and write to back storage such as cloud KMS 560.

Various secrets such as passwords, keys (e.g., SSH private keys and TLS private keys) may be removed from the SDF and replaced with identifiers. For example, SSH private keys may be replaced with account names for the SSH keys. For each SSH key identifier in the SDF, the SIMPL VM may communicate with the secrets store to confirm that it has an SSH private key with a corresponding identifier. The secrets store may use the config provided to it to connect to the appropriate backend to determine if the SSH private key is stored therein. The SSH private key may be returned if found. If not found, in one embodiment, the secrets store may generate a SSH private key and public key and store the new SSH private key to the backend. The new private key may be returned to the SIMPL VM. The SIMPL VM may convert it to the public version of that key. The Heat template may then contain the SSH public key, and once deployed, the node will have the relevant SSH public key.

Figure 6A:
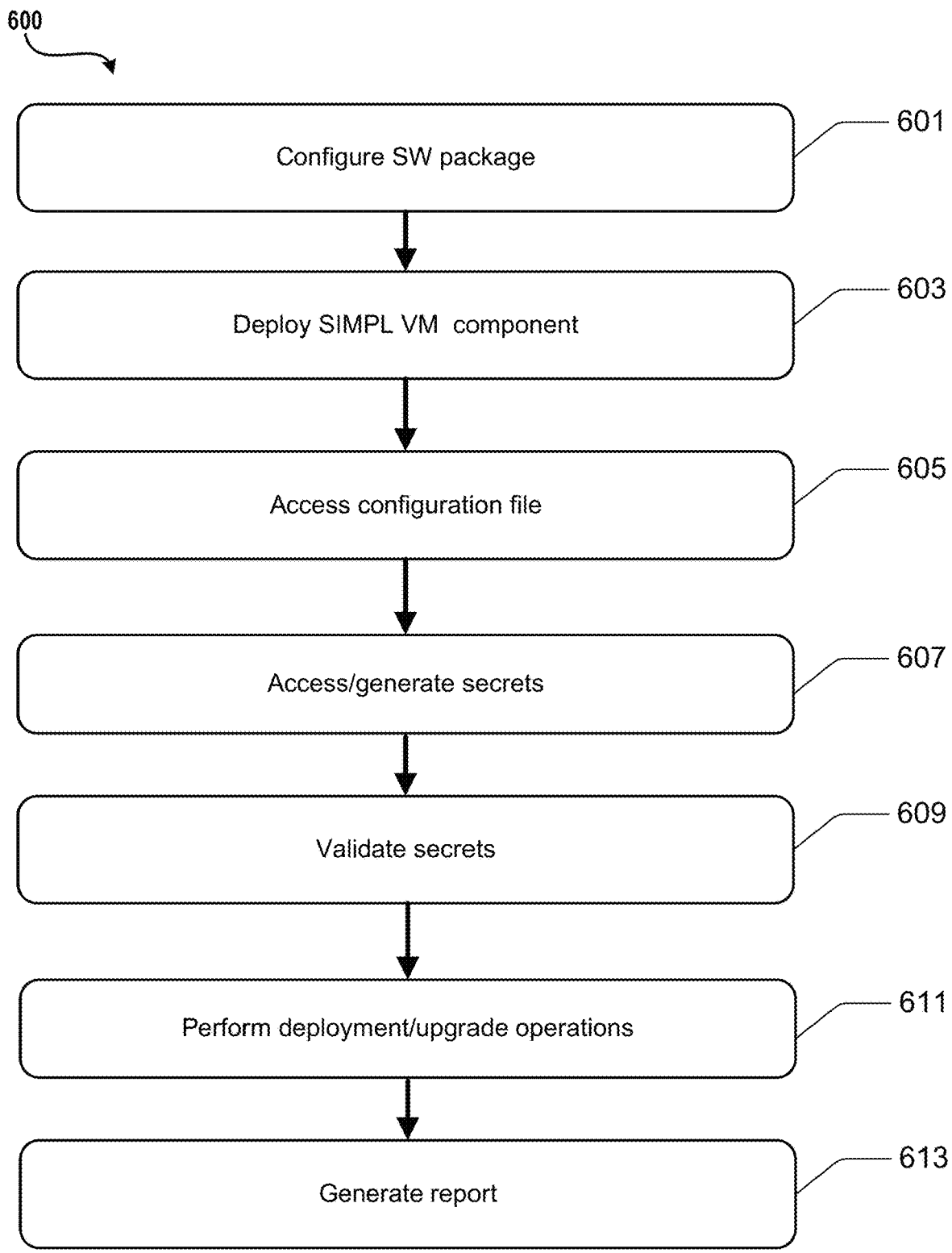
FIG. 6A is a flowchart depicting an example procedure for managing secrets in accordance with the present disclosure.

Turning now to FIG. 6A, illustrated is an example operational procedure for efficiently coordinating the upgrade of a VNFC running across various VMs in accordance with the present disclosure. In an embodiment, the computing environment comprises a computing service provider and a remote computing network.

Referring to FIG. 6A, operation 601 illustrates configuring the software package. Operation 601 may be followed by operation 603. Operation 603 illustrates deploying the SIMPL VM component. Operation 603 may be followed by operation 605. Operation 605 illustrates accessing a configuration file.

Operation 605 may be followed by operation 607. Operation 607 illustrates accessing or generating secrets as needed. Operation 607 may be followed by operation 609. Operation 609 illustrates validating the accessed or generated secrets. Operation 609 may be followed by operation 611. Operation 611 illustrates performing deployment or upgrade operations in accordance with the configuration file. Operation 611 may be followed by operation 613. Operation 613 illustrates generating a report based on the deployment or upgrade results.

Figure 6B:
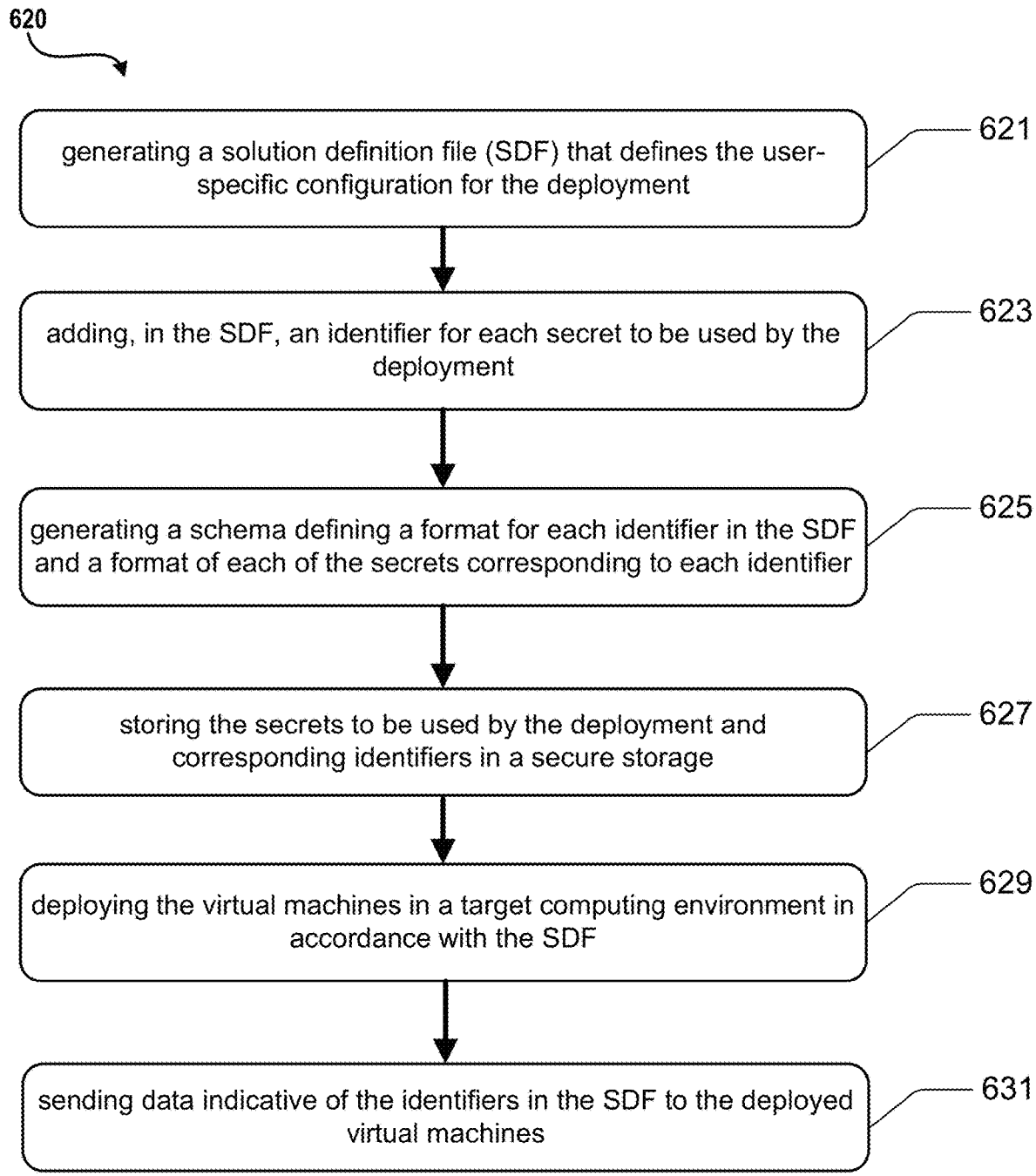
FIG. 6B is a flowchart depicting an example procedure for managing secrets in accordance with the present disclosure.

Turning now to FIG. 6B, illustrated is an example operational procedure for deploying a virtualized computing environment configured in a user-specific configuration. In an embodiment, the deployment may be managed by a deployment function. In an embodiment, the virtualized computing environment may comprise a plurality of virtual machines, an operational procedure can be provided by one or more components illustrated in FIGS. 1 through 5. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 620 is described as running on a system, it can be appreciated that the routine 620 and other operations described herein can be executed on an individual computing device or several devices.

Referring to FIG. 6B, operation 621 illustrates generating a solution definition file (SDF) that defines the user-specific configuration for the deployment.

Operation 621 may be followed by operation 623. Operation 623 illustrates adding, in the SDF, an identifier for each secret to be used by the deployment.

Operation 623 may be followed by operation 625. Operation 625 illustrates generating a schema defining a format for each identifier in the SDF and a format of each of the secrets corresponding to each identifier.

Operation 625 may be followed by operation 627. Operation 627 illustrates storing the secrets to be used by the deployment and corresponding identifiers in a secure storage.

Operation 627 may be followed by operation 629. Operation 629 illustrates deploying the virtual machines in a target computing environment in accordance with the SDF.

Operation 629 may be followed by operation 631. Operation 631 illustrates sending data indicative of the identifiers in the SDF to the deployed virtual machines. In an embodiment, the data is usable by the virtual machines to obtain the corresponding secrets from the secure storage.

The various aspects of the disclosure have been described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
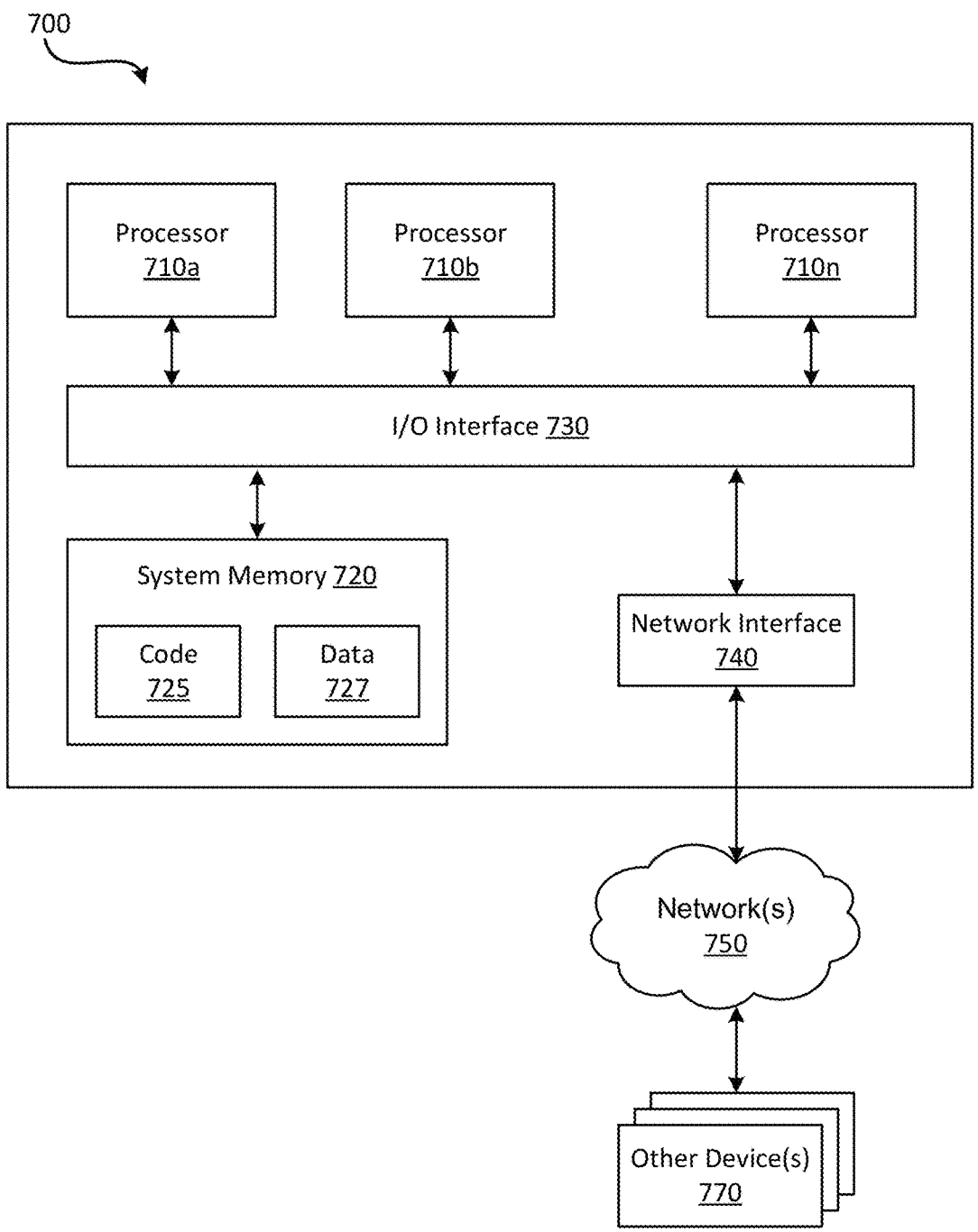
FIG. 7 is an example computing system in accordance with the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the ×77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for deploying, by a deployment function, a virtualized computing environment configured in a user-specific configuration, the virtualized computing environment comprising a plurality of virtual machines, the method comprising:

generating a solution definition file (SDF) that defines the user-specific configuration for the deployment;

adding, in the SDF, an identifier for each secret to be used by the deployment;

generating a schema defining a format for each identifier in the SDF and a format of each of the secrets corresponding to each identifier;

storing the secrets to be used by the deployment and corresponding identifiers in a secure storage;

deploying the virtual machines in a target computing environment in accordance with the SDF; and sending data indicative of the identifiers in the SDF to the deployed virtual machines, the data usable by the virtual machines to obtain the corresponding secrets from the secure storage.

Clause 2: The method of clause 1, wherein the secrets are received via user input.

Clause 3: The method of any of clauses 1-2, further comprising validating the received secrets against the schema.

Clause 4: The method of any of clauses 1-3, wherein the secrets are autogenerated in accordance with the schema.

Clause 5: The method of any of clauses 1-4, wherein the secrets comprise one or more of passwords, SSH keys, or certificates.

Clause 6: The method of any of clauses 1-5, wherein the secure storage is a key management system.

Clause 7: The method of clauses 1-6, wherein the deployment function is configured to:

execute as a virtual resource in the virtualized computing environment;

execute a series of operations in the virtualized computing environment that coordinate the deployment; and interact with a virtualized infrastructure manager (VIM) and the virtual machines to effect the deployment.

Clause 8: The method of any of clauses 1-7, wherein the secrets are a combination of user-provided secrets and autogenerated secrets.

Clause 9: A system comprising:

one or more processors; and a memory in communication with the one or more processors, the memory having computer-readable instructions stored thereupon that, when executed by the one or more processors, cause the system to perform operations comprising:

generating a solution definition file (SDF) that identifies a configuration for a deployment of a virtualized computing environment comprising a plurality of virtual machines, the SDF replacing each secret needed for the deployment with an identifier for the secret;

generating a schema specifying a format for each identifier for each secret included in the SDF and a format of the secrets, wherein the secrets and corresponding identifiers are stored in a secure storage;

deploying the virtual machines in the virtualized computing environment; and sending the identifiers to the deployed virtual machines, the identifiers usable by the virtual machines to obtain the secrets from the secure storage.

Clause 10: The system of clause 9, wherein the secrets are received via user input.

Clause 11: The system of any of clauses 9 and 10, further comprising instructions that, when executed by the one or more processors, cause the system to perform operations comprising validating the received secrets against the schema.

Clause 12: The system of any clauses 9-11, wherein the secrets are autogenerated in accordance with the schema.

Clause 13: The system of any clauses 9-12, wherein the secrets are a combination of user-provided secrets and autogenerated secrets.

Clause 14: The system of any clauses 9-13, wherein the secrets comprise one or more of passwords, SSH keys, or certificates.

Clause 15: The system of any clauses 9-14, wherein the secure storage is a key management system.

Clause 16: The system of any clauses 9-15, wherein the deployment is managed by a deployment tool configured to:
execute as a virtual resource in the virtualized computing environment;
execute a series of operations in the virtualized computing environment that coordinate the deployment; and
interact with a virtualized infrastructure manager (VIM) and the virtual machines to effect the deployment.

Clause 17: A computer-readable storage medium having computer-executable instructions stored thereupon which, when executed by one or more processors of a system, cause the system to:
generate a solution definition file (SDF) that identifies a configuration for a deployment of a virtualized computing environment comprising a plurality of virtual machines, the SDF replacing each secret needed for the deployment with an identifier for the secret;
generate a schema defining a format for each identifier for each secret included in the SDF and a format of the secrets;
store the secrets and corresponding identifiers in a secure storage;
deploy the virtual machines in the virtualized computing environment; and
send the identifiers to the deployed virtual machines, the identifiers usable by the virtual machines to obtain the secrets from the secure storage.

Clause 18: The computer-readable storage medium of clause 17, wherein the secrets are autogenerated in accordance with the schema.

Clause 19: The computer-readable storage medium of any of the clauses 17-18, wherein the secrets are received via user input and the received secrets are validated against the schema.

Clause 20: The computer-readable storage medium of any of the clauses 17-19, wherein the secure storage is a key management system.

The invention claimed is:

1. A method for deploying, by a deployment function, a user-specific configuration in a virtualized computing environment, the virtualized computing environment comprising a plurality of virtual machines, the method comprising:
generating a solution definition file (SDF) that defines the user-specific configuration for a deployment in accordance with the user-specific configuration, the deployment including a set of the plurality of the virtual machines configured to interoperate during the deployment;
adding, in the SDF, identifiers for a plurality of secrets to be used by the deployment;
generating a schema defining a format for each identifier in the SDF and a format of each of the secrets corresponding to each of the identifiers;
validating the secrets for the set of VMs configured to interoperate during the deployment, the validating including detecting whether requirements for any of the secrets have changed and confirming that the secrets conform to rules defined in the schema;
storing the secrets to be used by the deployment and corresponding identifiers in a secure storage;
deploying the set of the plurality of the virtual machines in a target computing environment in accordance with the SDF; and
sending data indicative of the identifiers in the SDF to the deployed virtual machines, the data usable by the virtual machines to obtain the corresponding secret from the secure storage.

2. The method of claim 1, wherein the plurality of secrets are received via user input.

3. The method of claim 1, wherein the plurality of secrets are autogenerated in accordance with the schema.

4. The method of claim 1, wherein the plurality of secrets comprise one or more of passwords, SSH keys, or certificates.

5. The method of claim 1, wherein the secure storage is a key management system.

6. The method of claim 1, wherein the deployment function is configured to:
execute as a virtual resource in the virtualized computing environment;
execute a series of operations in the virtualized computing environment that coordinate the deployment; and
interact with a virtualized infrastructure manager (VIM) and the set of the plurality of the virtual machines to effect the deployment.

7. The method of claim 1, wherein the plurality of secrets are a combination of user-provided secrets and autogenerated secrets.

8. A system comprising:
one or more processors; and
a memory in communication with the one or more processors, the memory having computer-readable instructions stored thereupon that, when executed by the one or more processors, cause the system to perform operations comprising:
generating a solution definition file (SDF) that identifies a configuration in accordance with a user-specific configuration, for a deployment of a virtualized computing environment comprising a plurality of virtual machines, the deployment including a set of the plurality of the virtual machines configured to interoperate during the deployment, the SDF replacing a plurality of secrets needed for the deployment with identifiers;
generating a schema specifying a format for each identifier included in the SDF and a format of the plurality of secrets, wherein the plurality of secrets and corresponding identifiers are stored in a secure storage;
validating the plurality of secrets for the set of virtual machines configured to interoperate during the deployment, the validating including detecting whether requirements for any of the plurality of secrets have changed and confirming that the plurality of secrets conform to rules defined in the schema;
deploying the set of the plurality of the virtual machines in the virtualized computing environment; and sending the identifiers to the deployed virtual machines, the identifiers usable by the virtual machines to obtain the plurality of secrets from the secure storage.

9. The system of claim 8, wherein the plurality of secrets are received via user input.

10. The system of claim 8, wherein the plurality of secrets are autogenerated in accordance with the schema.

11. The system of claim 8, wherein the plurality of secrets are a combination of user-provided secrets and autogenerated secrets.

12. The system of claim 8, wherein the plurality of secrets comprise one or more of passwords, SSH keys, or certificates.

13. The system of claim 8, wherein the secure storage is a key management system.

14. The system of claim 13, wherein the deployment is managed by a deployment tool configured to:
   execute as a virtual resource in the virtualized computing environment;
   execute a series of operations in the virtualized computing environment that coordinate the deployment; and
   interact with a virtualized infrastructure manager (VIM) and the set of the plurality of the virtual machines to effect the deployment.

15. A computer-readable storage medium having computer-executable instructions stored thereupon which, when executed by one or more processors of a system, cause the system to:
   generate a solution definition file (SDF) that identifies a configuration in accordance with a user-specific configuration, for a deployment of a virtualized computing environment comprising a plurality of virtual machines, the deployment including a set of the plurality of the virtual machines configured to interoperate during the deployment, the SDF replacing a plurality of secrets needed for the deployment with identifiers;
   generate a schema defining a format for each identifier for each secret included in the SDF and a format of the plurality of secrets;
   store the plurality of secrets and corresponding identifiers in a secure storage;
   validate the plurality of secrets for the set of the plurality of the virtual machines configured to interoperate during the deployment, the validating including detecting whether requirements for any of the plurality of secrets have changed and confirming that the plurality of secrets conform to rules defined in the schema;
   deploy the set of the plurality of the virtual machines in the virtualized computing environment; and
   send the identifiers to the deployed virtual machines, the identifiers usable by the virtual machines to obtain the plurality of secrets from the secure storage.

16. The computer-readable storage medium of claim 15, wherein the plurality of secrets are autogenerated in accordance with the schema.

17. The computer-readable storage medium of claim 15, wherein the plurality of secrets are received via user input.

18. The computer-readable storage medium of claim 15, wherein the secure storage is a key management system.

* * * * *